(Model.)

L. MILLER.
HARVESTER BINDER.

No. 259,329. Patented June 13, 1882.

Attest,
W. H. Knight,
Fred F. Church

Inventor,
Lewis Miller,
by Hill & Church
His Atty (Model.)

6 Sheets—Sheet 3

L. MILLER.
HARVESTER BINDER.

No. 259,329.                    Patented June 13, 1882.

Attest,
W. H. H. Knight
G. K. Ryndel

Inventor,
Lewis Miller
By Dice & Church
His Attys.

(Model.)

6 Sheets—Sheet 4.

L. MILLER.
HARVESTER BINDER.

No. 259,329.  Patented June 13, 1882.

Attest,
W. H. H. Knight
Fred F. Church

Inventor,
Lewis Miller,
By Hine & Church
His attys (Model.)
L. MILLER.
HARVESTER BINDER.
6 Sheets—Sheet 5.
No. 259,329. Patented June 13, 1882.
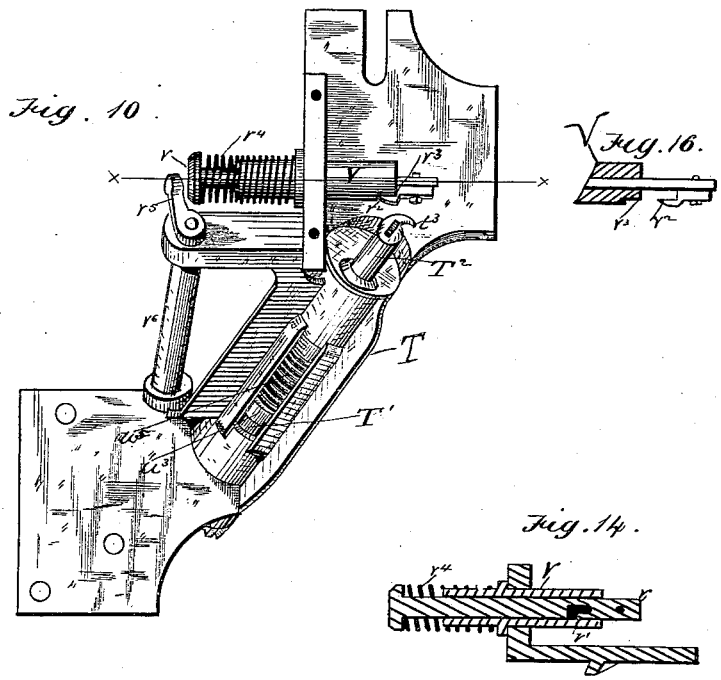
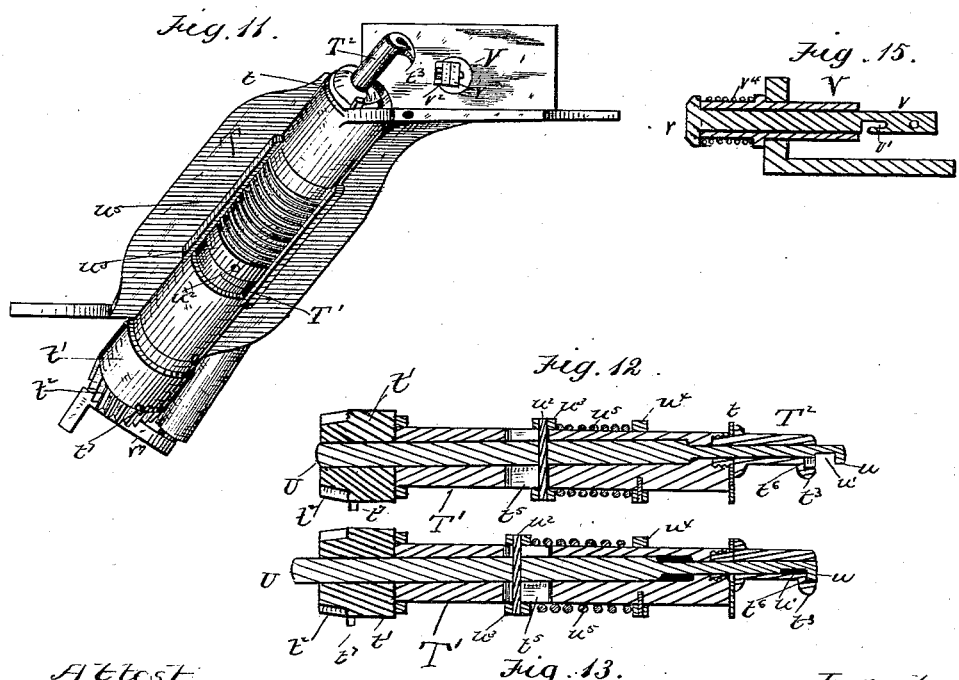
Attest,
W. H. H. Knight
Fred F. Church
Inventor,
Lewis Miller
By Hill & Church
His attys.

(Model.)

L. MILLER.
HARVESTER BINDER.

No. 259,329. Patented June 13, 1882.

Witnesses:
W. H. H. Knight
Fred F. Church

Inventor:
Lewis Miller
By Hill & Church
His Attys

UNITED STATES PATENT OFFICE.

LEWIS MILLER, OF AKRON, OHIO.

HARVESTER-BINDER.

SPECIFICATION forming part of Letters Patent No. 259,329, dated June 13, 1882.

Application filed October 27, 1880. (Model.)

*To all whom it may concern:*

Be it known that I, LEWIS MILLER, of Akron, in the county of Summit and State of Ohio, have invented certain new and useful Improvements in Harvester-Binders; and I do hereby declare the following to be a full, clear, and exact description of the same, reference being had to the accompanying drawings, forming part of this specification, in which—

Figure 1:
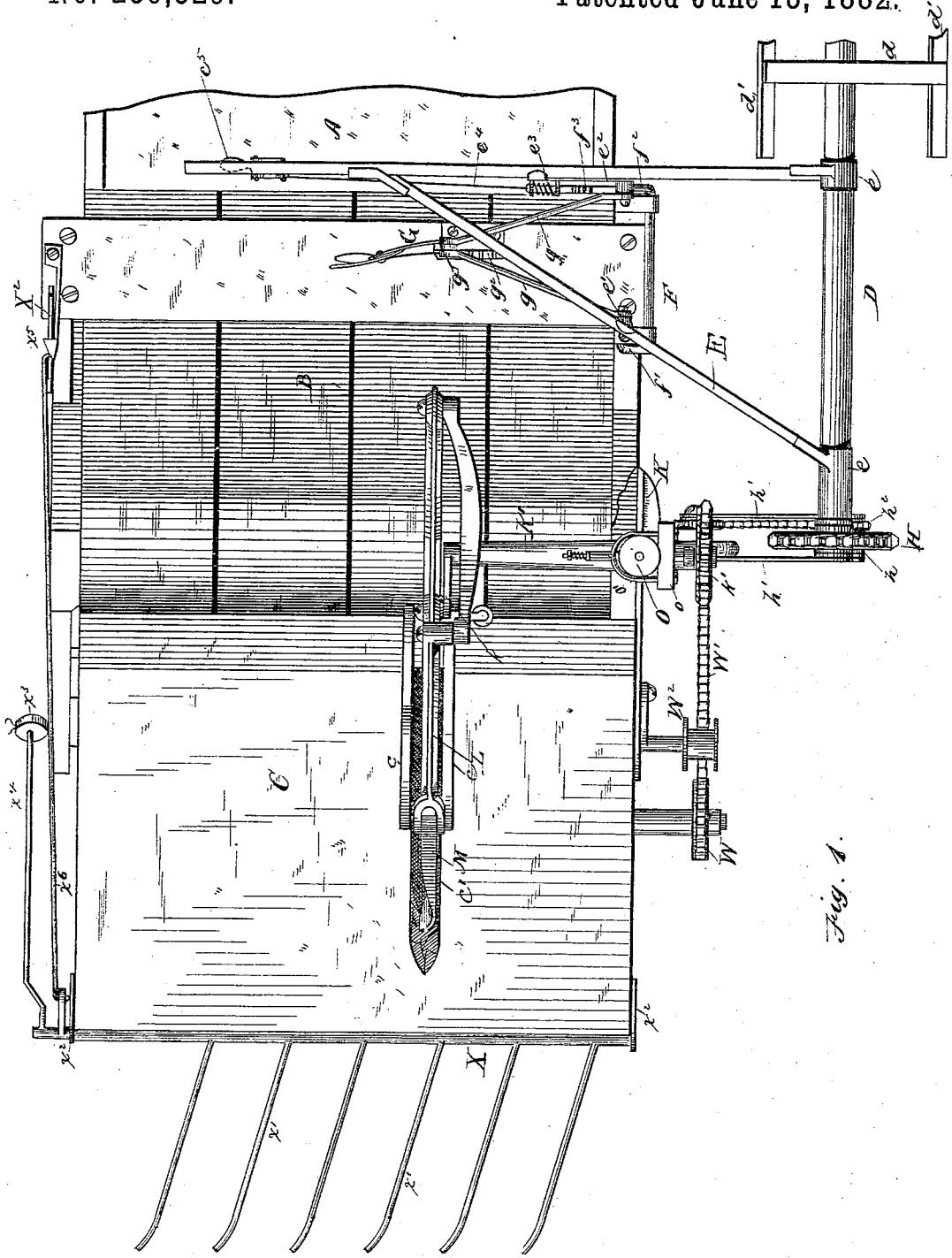
Figure 2:
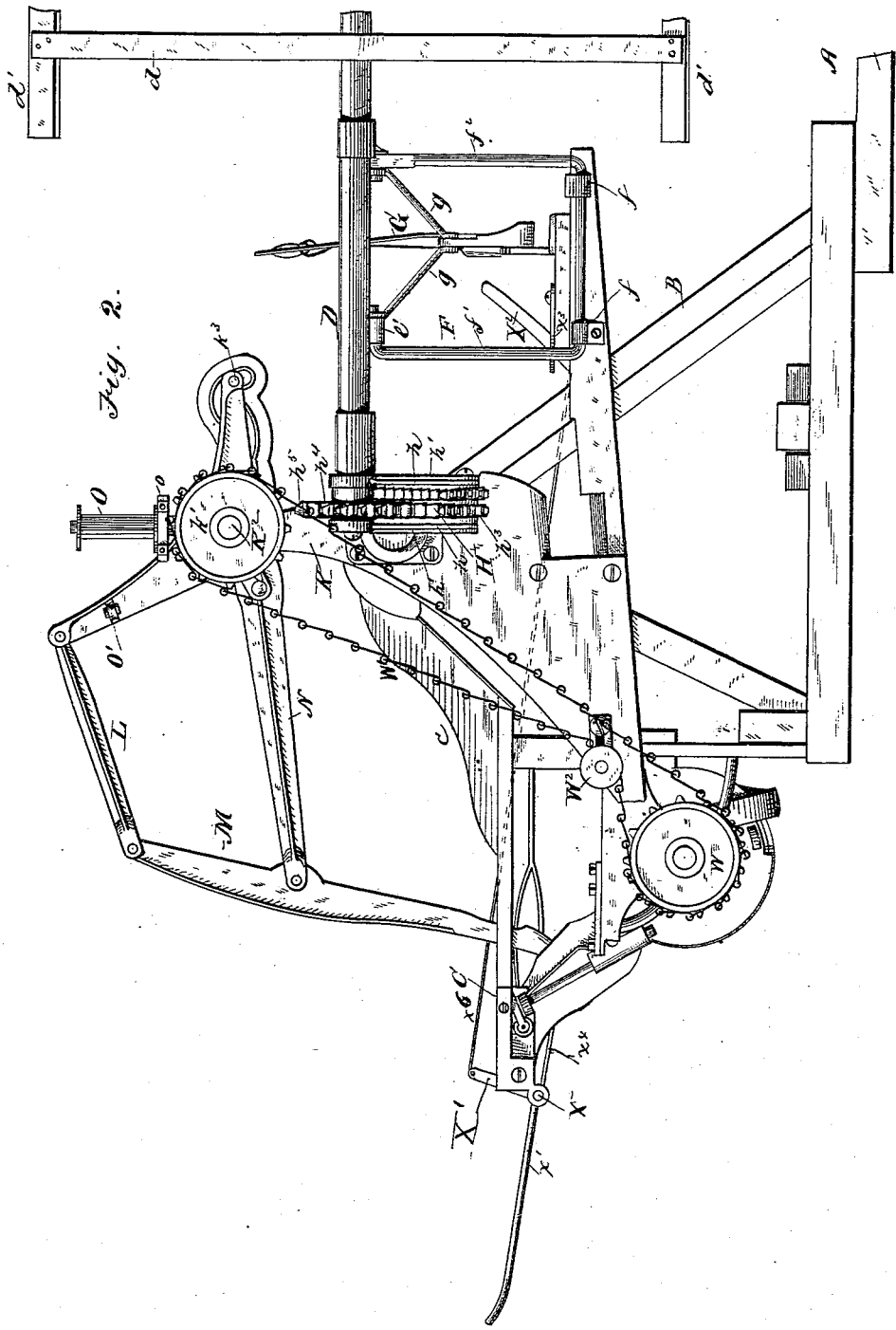
Figure 3:
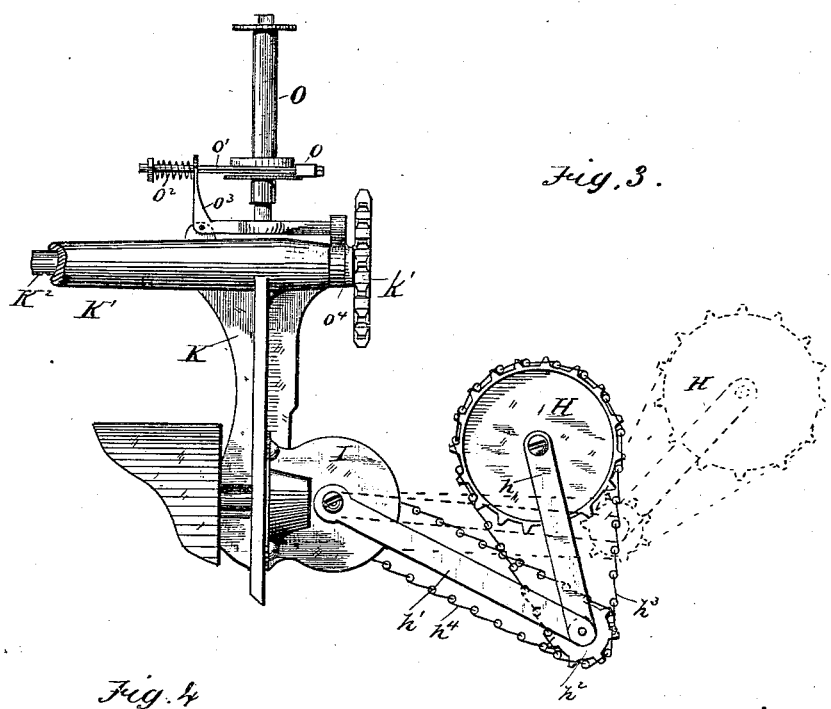
Figures 4, 5:
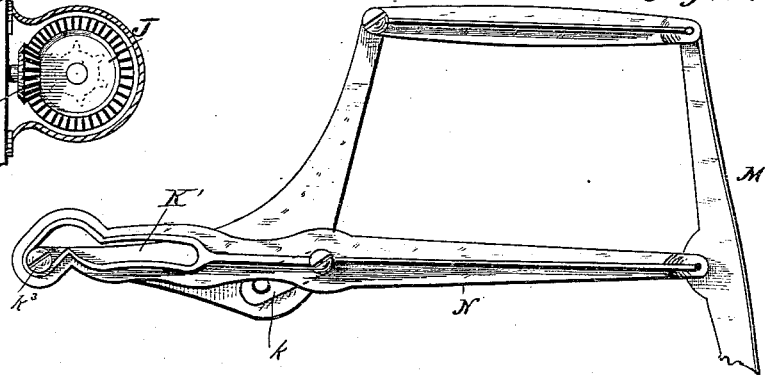
Figure 6:
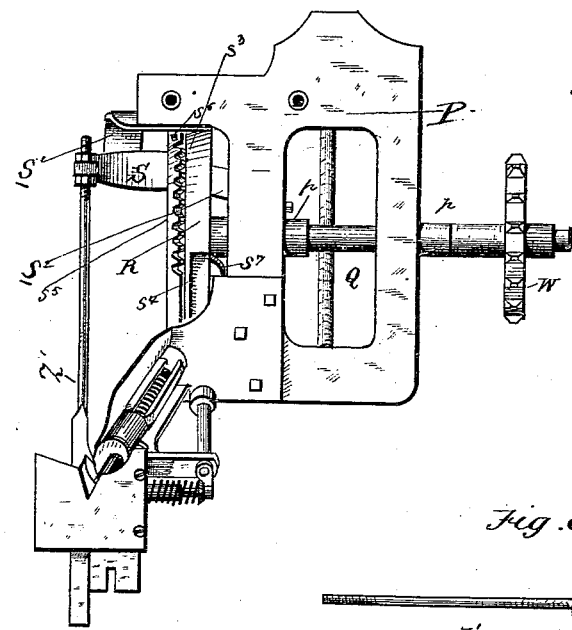
Figure 8:
Figure 7:
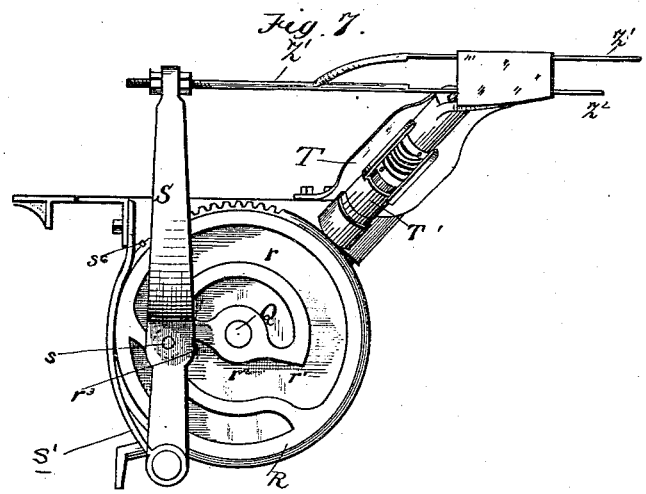
Figure 9:
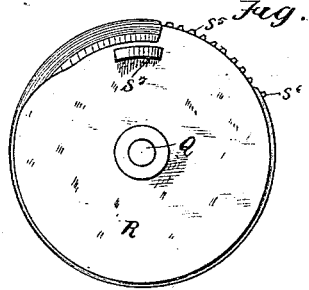
Figure 17:
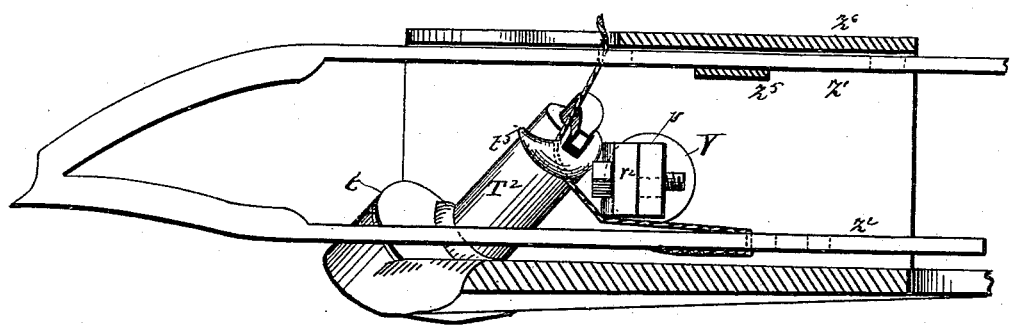

Figure 1 is a plan view of the machine; Fig. 2, a front end elevation of the same. Fig. 3 is a detail view, showing the mechanism for operating the reel-shaft and also the tension devices; Fig. 4, a view of the gears which operate one of the endless chains of the reel mechanism; Fig. 5, a detached view, showing the binding-arm and connected parts. Fig. 6 is a top plan view of the binding mechanism; Fig. 7, a side elevation of the same; Fig. 8, a view of the cord-carrying bar. Fig. 9 is a side elevation of the main actuating-wheel. Figs. 10 and 11 are respectively a top plan view and a front view of the looping and tying mechanism, the clamp, and the cutter. Figs. 12 and 13 are views of the looping and tying devices, showing in the former figure the retracting-bar projected and in the latter figure the same retracted. Figs. 14, 15, and 16 are detail sectional views of the clamping and cutting devices; Figs. 17 to 21, inclusive, views showing the position of parts in various stages of the tying operation.

Similar letters of reference in the accompanying drawings indicate the same parts.

This invention relates to that class of machines known as "harvester-binders;" and it consists primarily in certain improvements in the means for adjusting and operating the reel; and, secondly, to certain improvements in the binding mechanism, which I will now proceed to describe.

In the drawings, A represents the grain-platform of the machine, upon which the grain falls as it is cut, and from which it is conveyed up the elevator-platform B by a suitable elevator and deposited upon the binding-table C in position to be bound.

D is the reel-shaft, having secured to it the radial arms $d$, to which are secured in turn the reel-blades $d'$ parallel to the reel-shaft, as shown. The reel-shaft is mounted in the tubular bearings $e\ e$, attached to the ends of the arms of a bifurcated lever, E, and is adapted to turn freely in said bearings.

The fulcrum of the bifurcated lever E consists preferably of a rectangularly-bent metal rod or bar, F, hinged at its lower horizontal portion to the frame of the machine by means of eyes or sockets $f\ f$, and having two upwardly-extending portions, $f'\ f^2$, the end of the former of which is bent at right angles to enter a socket, $e'$, on one arm of the bifurcated lever, and the end of the latter of which, $f^2$, is perforated for the reception of a pivotal stud which projects laterally from a plate, $e^2$, on the other arm of the bifurcated lever. Upon the portion $f^2$ is also formed a toothed sector, $f^3$, with which a spring-bolt, $e^3$, mounted in guides on the plate $e^2$, is adapted to engage.

The spring-bolt is operated by means of a connecting-rod, $e^4$, and a short pivoted operating-lever, $e^5$, located at the inner end of the lever E, as shown.

The said inner end of the lever E is intended to be within convenient reach of the driver, and by grasping it and at the same time operating the short lever to disengage the spring-bolt from the toothed sector the driver can raise or lower the reel, so as to accommodate it to the height of the grain, and lock it in its adjusted position.

Connected to the fulcrum of the lever E are rods $g\ g$, which extend to a second adjusting-lever, G, that is also provided with a spring-bolt, $g'$, adapted to engage with a cogged segment, $g^2$. By means of this secondary lever the fulcrum of lever E can be oscillated back and forth, so as to cause the reel to be adjusted in and out nearer to or farther from the platform, as occasion may require.

On the inner end of the reel-shaft a large sprocket-wheel, H, is firmly fixed, so as to rotate therewith, and on opposite sides of said sprocket-wheel depend from the reel-shaft two non-rotating arms, $h\ h$, which are connected at their lower ends to another pair of arms, $h'\ h'$, articulated to a casting, I, as shown in Fig. 3.

Upon the pivotal bolt which connects the two pairs of arms is a double sprocket-wheel, $h^2$, around one portion of which works an endless chain, $h^3$, that also passes around the sprocket-wheel on the reel-shaft, and around the other portion of which works a second endless chain, $h^4$, that passes also around a sprocket-wheel, $h^5$, connected to and adapted to revolve with a bevel-pinion, J, mounted within the casting I and operated by means of a smaller beveled pinion, $j$, as shown in Fig. 4. This arrangement of gearing enables the reel to be easily adjusted in any position that may be desired without causing a slackening or tightening of the endless chains or interfering in any way with the proper rotation of the reel.

K is a metal frame or casting, secured to the front of the main frame of the machine, and having a horizontal arm, K′, which projects out over the upper portion of the elevator-platform, as shown in Fig. 1. This horizontal arm is made hollow for the accommodation of a shaft, $K^2$, which has a crank, $k$, on one end and a sprocket-wheel, $k'$, on the other end.

To an upward extension of the arm K′ is articulated a bar, L, to which the upper end of the binding or cord-carrying arm M is connected, and connected at or near the middle of the binding-arm is another bar, N, which is mounted on the wrist of the crank, and has a cam-slot in its rear portion, into which projects a stud or friction sleeve, $k^3$, on a rearward extension of the arm K′.

As the crank is rotated the slotted portion of the bar N plays back and forth on the stud $k^3$, and the point of the binding-arm is caused to be projected through the stream of grain being delivered onto the binding-table by the elevator, and to pass down between the guards $c$ and through the slot $c'$ in the binding-table to the front edge of the table, and thence up again, as will be presently explained.

The binding-cord is wound upon a spool, O, and passes thence over a guide-roller, O′, and thence through a perforation in the point of the binding-arm. The cord is kept under constant tension by means of a friction shoe or brake, $o$, applied to the spool O by means of a yoke, $o'$, a spring, $o^2$, and bell-crank lever $o^3$, and is given a greater tension when it is operating to assist in compressing the bundle by means of a cam or projection, $o^4$, on the hub of the sprocket-wheel $k'$, which operates to raise the outer arm of the bell-crank lever and further compress the spring, all as described and claimed in my application for Letters Patent filed on the 2d day of April, 1880.

The mechanism by which the two ends of the cord which is passed around the bundle are tied together and then severed below the knot is arranged beneath the binding-table, and is constructed as follows:

P is a metal frame or casting, bolted securely to the timbers of the main frame of the machine, and having hangers $p\ p$, that support a shaft, Q, upon which is mounted and rigidly secured a main actuating-wheel, R.

The actuating-wheel R is provided with a cam-groove, $r\ r'\ r^2\ r^3$, in its outer face, as shown clearly in Fig. 7, in which works a friction-roller, $s$, mounted on an arm or lever, S, fulcrumed to depending metal straps $s'\ s^2$, as shown in Figs. 6 and 7. The periphery of the actuating-wheel is provided with a substantially V-shaped groove, $s^3$, a cut-away portion, $s^4$, a series of cog-teeth, $s^5$, and a spur or projection, $s^6$, while its inner face is provided with an inclined projection or cam, $s^7$, for a purpose to be presently explained.

Bolted to the metal casting P is another upwardly-inclined casting or holder, T, containing a cylindrical shaft, T′. This shaft is provided at its upper end with a flange or collar, $t$, which bears upon the top of the holder T, and it is provided at its lower end with a fixed cylindrical sleeve, $t'$, having cog-teeth $t^2$, that are adapted to engage with the teeth $s^5$ on the periphery of the actuating-wheel when the latter is rotated.

Inserted eccentrically in the upper end of the bar T′ is a looping and tying head, $T^2$, the shank of which is substantially cylindrical, while its extremity is formed into a laterally-projecting curved hook, $t^3$, as shown.

In an opening extending diagonally through the shaft T′ and through the looping and tying head $T^2$ plays a retracting-bar, U. This retracting-bar is preferably made thinner where it passes through the looping and tying head, and its upper end is formed with a lateral projection or jaw, $u$, and a recess, $u'$, below said projection, as shown in Figs. 12 and 13.

A slot, $t^5$, is made transversely through the shaft T′, and in said slot works a pin, $u^2$, that passes through the retracting-bar U and into a ring, $u^3$, surrounding said shaft.

Coiled about the shaft T′, between the ring $u^3$ and a fixed ring, $u^4$, is a spiral spring, $u^5$, which operates to force downward the retracting-bar and hold its lower rounded end in contact with the inner beveled wall of the V-shaped groove in the periphery of the actuating-wheel until the cut-away portion $s^4$ of the wheel comes around, whereupon said spring forces the retracting-bar farther downward, so as to cause the projection or jaw on its upper end to be withdrawn entirely within a recess, $t^6$, formed in the end of the looping-head, as shown.

The teeth on the actuating-wheel are preferably ten in number, and there are ten operative cog-teeth and a short inoperative tooth or blank space on the fixed sleeve $t'$, from which it follows that upon every revolution of the actuating-wheel the teeth on the actuating-wheel engage with the teeth on the fixed sleeve and cause one complete revolution of the looping and tying head, while when the teeth are not in engagement the short inoperative tooth of the sleeve rides in contact with the smooth outer wall of the V-shaped groove in the periphery of the actuating-wheel and holds the looping and tying head stationary, as will be readily understood.

The spur or projection $s^6$ on the actuating-wheel is adapted to strike a similar spur or projection, $t^7$, on the sleeve $t'$, opposite the short tooth thereof, and thus insure the proper engagement of the teeth. Connected to the upper end of the lever S is a horizontally-moving bar, Z′, having an upper arm, z′, and a lower arm, z². The upper arm, z′, is provided with a notch, z³, on its side next the looping and tying head, and the lower arm, z², with a shorter notch, z⁴, on the same side, all as shown clearly in Fig. 8. The upper arm, z′, slides above the looping and tying head and passes through a guide, z⁵, on a plate, z⁶, while the lower arm, z², slides below the looping and tying head.

In front of and slightly below the upper end of the looping and tying head the clamping and cutting mechanism is arranged. This mechanism consists of a tubular holder, V, located at right angles to the path of the horizontally-moving bar Z′, a clamping-bar, v, having a right-angled slot, v′, in its under side, a knife or cutter, v², secured rigidly to the bar and adapted to co-operate with a shoulder, v³, on the holder V, a spring, v⁴, for keeping the clamping-bar normally retracted, and an arm, v⁵, on a rock-shaft, v⁶, operated by a crank, v⁷, on the rock-shaft and the cam s⁷ on the main actuating-wheel.

The shaft Q, on which the main actuating-wheel is mounted, is provided on its outer end with a sprocket-wheel, W, around which passes an endless chain, W′, that also passes around the sprocket-wheel k′ on the driving-shaft K², and an adjustable flanged pulley, W², is employed to properly tighten said endless chain.

Figure 18:
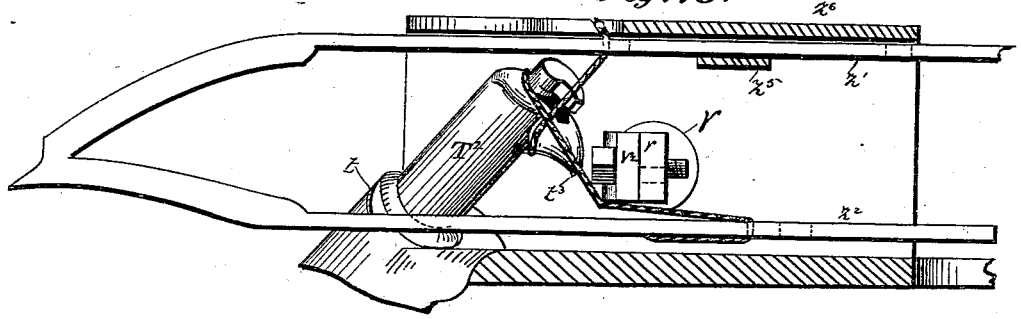
Figure 19:
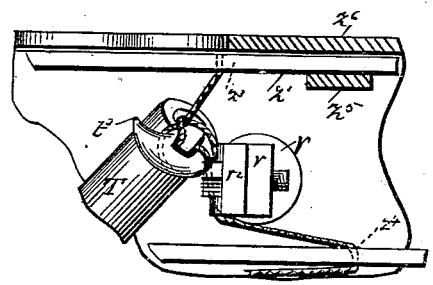
Figure 20:
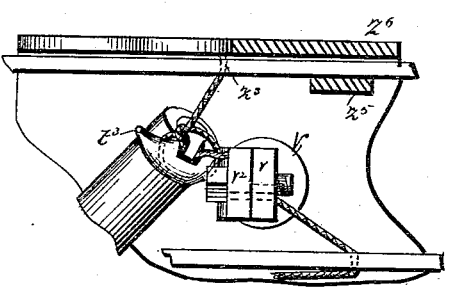
Figure 21:
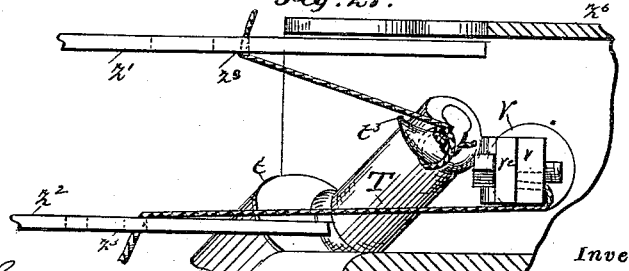

The several parts of the binding mechanism having been described, a description of its operation can now be readily understood. Let it be supposed that the point of the binding-arm, with the cord threaded through it, is at the front edge of the binding-table, and that the end of the cord is held by the operator. Upon the mechanism being set in motion the point of the binding-arm passes upward and backward, and then down between the guards c c and through the slot c′ in the binding-table toward the front edge of the table. Meanwhile the friction-roller s is traveling in the concentric portion r of the cam-groove of the actuating-wheel and the lever S and bar Z′ are stationary. By the time the point of the binding-arm reaches the extreme outward limit of its movement and is just about to begin to rise—in which position it is momentarily stationary—the friction-roller enters the portion r′ of the cam-groove and causes the lever S and bar Z′ to be thrown forward, and that part of the cord which is between the point of the binding-arm and the end held by the operator to be caught first by the notch z⁴ of the lower arm, z², and then by the notch z³ in the upper arm, z′, and carried forward over the hook of the looping and tying head and under the clamping-bar into the position shown in Fig. 17. The lever S and bar Z′ remain stationary momentarily while the friction-roller s is passing through the concentric portion r² of the cam-groove, and while so stationary the spur s⁶ on the actuating-wheel strikes the spur on the cog-sleeve t′ and throws the teeth of the cog-sleeve into engagement with the teeth of the actuating-wheel, causing thereby a rotation of the shaft T′ and of the looping and tying head thereon. When the looping and tying head has made a half-revolution the cord becomes crossed, as shown in Fig. 18, and when it has made three-quarters of a revolution one part of the cord is carried under the projection or jaw u of the retracting-bar; but just before it completes a full revolution the retracting-bar descends, and the part of the cord under its projection or jaw is drawn down within recess t⁶ in the looping and tying head and held clamped therein. The descent of the retracting-bar is caused by its lower end being forced against the cut-away portion s⁴ of the periphery of the actuating-wheel by the operation of the spring u⁵. Simultaneously with the descent of the retracting-bar the cam-projection s⁷ on the side of the actuating-wheel strikes the crank v⁷ and vibrates the shaft v⁶, so that the arm v⁵ will strike the end of the clamping-bar and project the latter against the tension of spring v⁴ far enough to permit that portion of the cord which is between the tying and looping head and the notch in the lower arm, z², to pass in between the cutter v² and co-operating-shoulder v³ and to enter into the right-angled slot v′ in the clamping-bar v. After the cam-projection passes by the crank the spring v⁴ forcibly retracts the clamping-bar and causes the cutter to sever the cord, leaving the part in the slot v′ to be carried within the holder V and securely held therein. By the time this is accomplished the friction-roller enters the part r³ of the cam-groove and draws the lever S and bar Z′ backward again, causing that portion of the cord held by the clamp to be carried backward to the position shown in Fig. 21 and that portion of the cord which has been looped around the curved point of the head to be also carried backward, so as to draw the loop off said point and complete the knot. The retracting-bar then rides up out of the cut-away portion of the actuating-wheel and releases the end of the cord held by the projection u. The knotted piece of cord is then thrown away. Starting now with the end of the cord in the clamping-jaw, the binding-arm again rises and moves backward, and this time its point passes through the stream of grain being delivered upon the binding-table and separates a quantity therefrom sufficient for a bundle, carries the cord around the same, passes beneath the table, and carries the cord into the notches in the arms z′ z². Both strands being now together in the notches, the bar advances to enable the looping and tying head and the clamp and cutter to operate upon the two strands in the manner described in detailing the manipulation of the single strand of cord. After the bundles are bound they are pushed off the binding-table onto a series of arms or fingers, x′, which project outward from a rock-shaft, X, mounted in bearings $x^2$, as shown. The bodies of the arms $x'$ are inclined toward the rear of the machine, and their outer ends are curved in the same direction, as seen in Fig. 1.

Secured to one end of the rock-shaft is a crank, X', which is connected by a rod, $x^6$, to a lever, $X^2$, within reach of the driver. After a number of bundles have accumulated upon the arms $x'$ the driver, by operating the lever $X^2$, is enabled to tilt the rock-shaft and allow the bundles to slide off the arms, the shape and inclination of the latter directing them toward the rear of the machine, as will be readily understood.

An adjustable counterbalancing-weight, $x^3$, mounted upon an arm, $x^4$, is employed to bring the bundle-supporting arms back to their normal position, and a spring-catch, $x^5$, or other suitable device is provided to automatically lock the lever $X^2$ until it becomes necessary to again operate it.

I claim as my invention—

1. The bifurcated lever E, having the reel-shaft journaled in its outer ends and pivoted centrally to the vibratory fulcrum F, in combination with said vibratory fulcrum pivoted to brackets $f\,f$, the toothed sector $f^3$ on the portion $f^2$ of said fulcrum, and the spring-bolt $e^3$ for engaging with said toothed sector, the secondary lever G, the rods $g\,g$, connecting said secondary lever to the said vibratory fulcrum, and the segment and locking-bolt for securing said secondary lever, the whole arranged substantially as described.

2. The combination, with the reel-shaft and the means for adjusting it vertically and horizontally, of the sprocket-wheel rigidly secured to the end of said shaft, so as to rotate therewith, the two non-rotating arms $h\,h$, depending from the shaft on opposite sides of the sprocket-wheel, a second pair of arms, $h'\,h'$, connected at one end to the first-mentioned pair by a pivotal bolt and at the other end to the casting I, the double sprocket-wheel $h^2$, mounted on said pivotal bolt between the arms, the sprocket-wheel $h^5$, connected to the bevel-wheel J and driven from the elevator-shaft, and the endless chains $h^3\,h^4$, substantially as described, for the purpose specified.

3. In a harvester-binder, the looping and tying head, having its curved hook $t^3$ normally projecting at substantially right angles to the movement of the horizontally-sliding bar, in combination with said horizontally-sliding bar, having the upper and lower notched arms, which move respectively above and below the looping and tying head and operate to carry the strands of cord over said head, in position for the latter to loop and tie them, substantially as described.

4. In a harvester-binder, the combination of the looping and tying head $T^2$, having the curved hook $t^3$, normally projecting at substantially right angles to the line of movement of the horizontally-sliding bar Z', in combination with the retracting-bar U, having the hooked end $u$, and with the said horizontally-moving bar Z', having the upper and lower notched arms, which move respectively above and below the tying-head and operate to carry both strands of the cord over the curved hook of the looping and tying head, substantially as described.

5. In a harvester-binder, the combination of the looping and tying head $T^2$, having the curved hook $t^3$, which normally projects at substantially right angles to the line of movement of the horizontally-sliding bar Z', in combination with the retracting-bar U, the said horizontally-moving bar Z' having the upper and lower notched arms, and with the clamp $v$ V and the cutter $v^2\,v^3$, substantially as described.

6. In a harvester-binder, the combination of the clamping-bar having the right-angled slot and carrying the cutter with the holder for said bar, the spring for retracting the bar, the crank-shaft having the arm on its upper end and the crank on its lower end, and the cam on the side of the actuating-wheels, substantially as described.

7. The combination, with the binding-table, of the rock-shaft X, having the bundle-supporting fingers $x'$, the arm $x^4$, carrying the counterbalance-weight $x^3$, the rod $x^6$, connected at one end to the crank on the rock-shaft and at the other to the hand-lever $X^2$, and the catch $x^5$, for automatically locking the handle when the bundle-supporting fingers are brought back to normal position, the whole arranged for operation substantially as described.

8. The combination, with the binding-table, of the rock-shaft X, journaled in bearings at the edge of said table, and having the bundle-supporting fingers $x'$ inclined toward the rear of the machine and curved at their extreme ends in the same direction, substantially as described.

LEWIS MILLER.

Witnesses:
N. N. LEOHUER,
S. P. WALLACE.